United States Patent [19]

Tucker

[11] Patent Number: 5,306,044
[45] Date of Patent: Apr. 26, 1994

[54] BODY RESTRAINT SYSTEM

[76] Inventor: Curt L. Tucker, 1365 Midland Rd., Saginaw, Mich. 48603

[21] Appl. No.: 850,341

[22] Filed: Mar. 11, 1992

[51] Int. Cl.⁵ ............................................. A44B 21/00
[52] U.S. Cl. .................................. 280/801.1; 280/808
[58] Field of Search ..................... 280/801, 808, 802; 247/484, 466, 467; 24/573.6, 631, 632, 634, 630; 244/151 A, 151 R

[56] References Cited

U.S. PATENT DOCUMENTS

| | | | |
|---|---|---|---|
| 2,956,324 | 10/1960 | Klein | 24/230 |
| 2,992,467 | 7/1961 | Gaylord | 24/230 |
| 3,034,596 | 5/1962 | Twaits, Jr. | 182/3 |
| 3,404,439 | 10/1968 | Jones | 244/151 A |
| 3,495,849 | 2/1970 | Cetrone | 280/150 |
| 3,747,167 | 7/1973 | Pravaz | 24/632 |
| 3,767,143 | 10/1973 | Gaylord | 244/151 A |
| 3,767,144 | 10/1973 | Gaylord | 24/632 |
| 4,738,413 | 4/1988 | Spinosa | 297/467 |
| 4,848,793 | 7/1989 | Huspen | 297/484 |
| 4,927,211 | 5/1990 | Bolcerek | 297/484 |
| 5,220,946 | 6/1993 | Gunter | 244/151 R |

OTHER PUBLICATIONS

Deist Pamphlet.

Tucker Cam-Lock Release Body drawing.

Primary Examiner—Robert J. Oberleitner
Assistant Examiner—Clifford T. Bartz
Attorney, Agent, or Firm—Learman & McCulloch

[57] ABSTRACT

A restraint system for restraining a person in a vehicle includes a cam release assembly with an open strap lug chamber. Right and left shoulder straps are anchored to a vehicle frame and attached to the release assembly. Right and left lap straps are anchored to the frame and attached to the release assembly. A leg strap is attached to the right lap strap and the left lap strap, and has a center portion attached to the cam release assembly. An adjustable length sternum strap is attached to the shoulder straps. A kidney belt is attached to the lap straps. Right and left chest pads are attached to the shoulder straps and have enlarged portions that overlap under the sternum strap and may overlap under the shoulder straps. A pelvic pad is positioned between the cam release assembly and the person being restrained. The strap lugs can pivot about 15° about the axis of the retainer pins. Separate length adjusters are provided for each shoulder strap, each lap strap and for the kidney belt. Two length adjusters are provided for the leg strap.

24 Claims, 4 Drawing Sheets

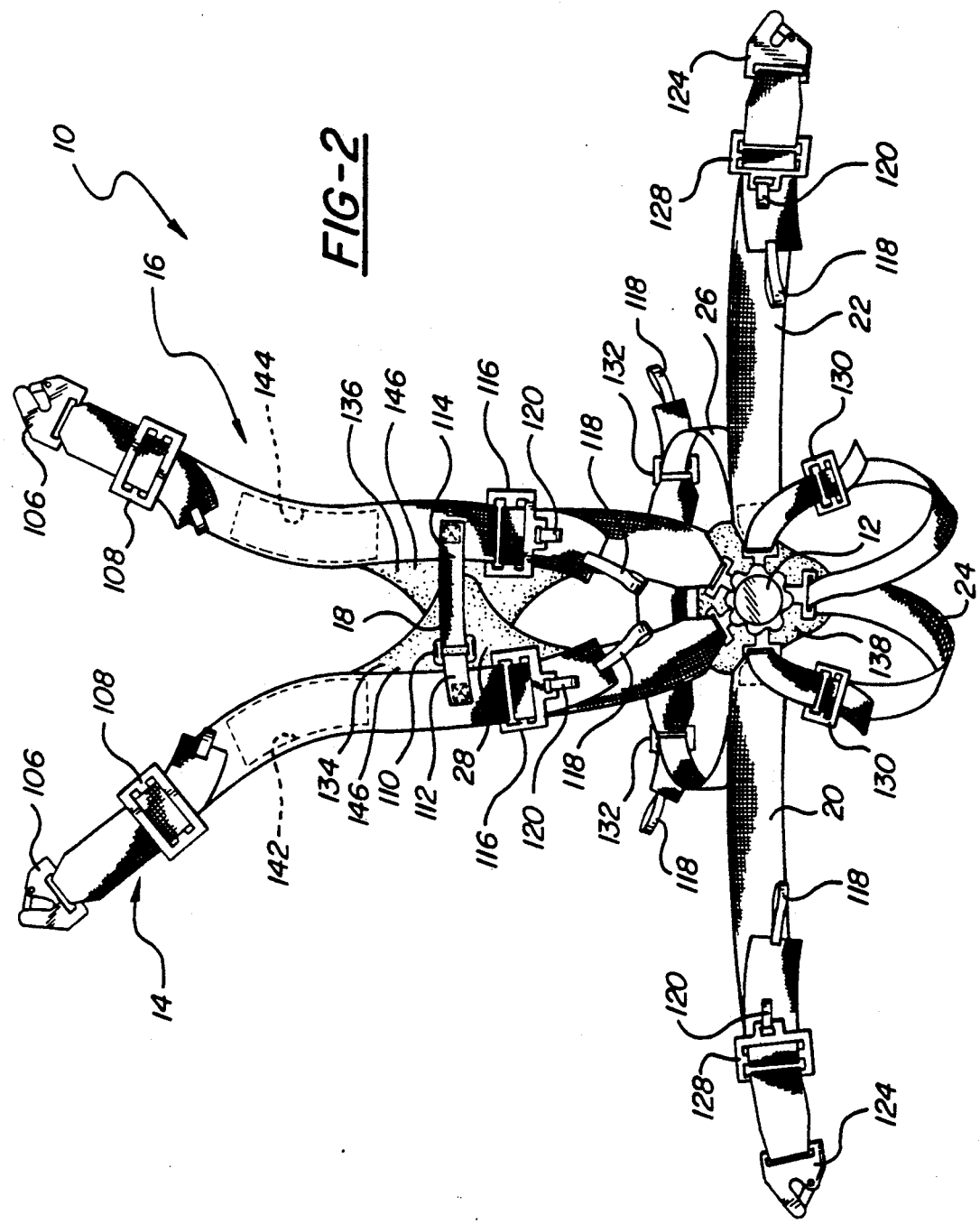

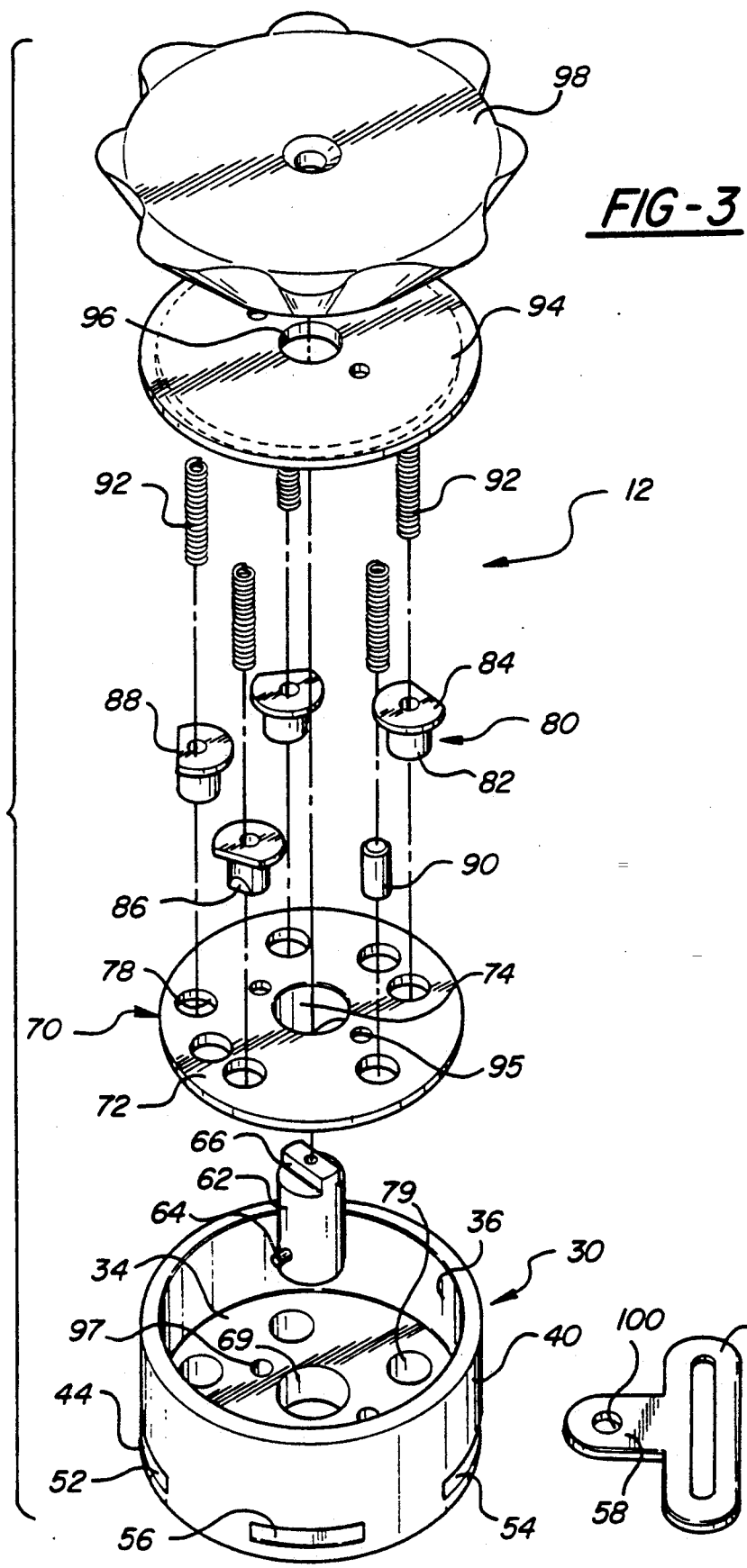

BODY RESTRAINT SYSTEM

TECHNICAL FIELD

The invention relates to a body restraint system for protecting and restraining drivers of race cars, and for restraining drivers and passengers in off road vehicles.

BACKGROUND OF THE INVENTION

Restraint systems are used to reduce injuries to drivers and passengers in all types of vehicles. The design of a restraint system depends upon the vehicle the restraint system is used in and the expected use of the vehicle. Restraint systems used in off road vehicles and race cars are very well developed. Drivers of race cars involved in high speed crashes frequently walk away from the vehicle following a crash or escape with relatively minor injuries due to protection provided by the driver cage and the restraint system which holds the driver in a safe area defined by the driver cage.

The primary functions of restraint systems are to hold the driver or passenger within a safe area in the vehicle, to hold the driver in a position from which he can operate the vehicle controls, and to reduce injury to drivers and passengers. Restraint systems are currently available which hold a person within a safe area inside a vehicle. Some restraint systems that are currently available allow a person to move to positions from which it is difficult to operate vehicle controls. It is also known for current systems to cause some injury to the person restrained.

Restraint systems normally include straps made from nylon or other suitable material. When these straps are placed under a load they tend to straighten and become hard. The pressure exerted on these straps by a human body during a crash can be sufficient to break bones. Shoulder straps can break collar bones, for example. After the collar bone breaks, the sternum may hyperextend and the upper body may force the shoulder straps apart and move between the shoulder straps.

The lap belt portion of a restraint system can also cause injury to the person being restrained. If a lap belt is too low, the hip joints can be injured. If a lap belt is too high, the abdomen may be injured. To prevent these injuries, the lap belt should restrain the pelvis and the pelvis should not slide out of the lap belt in either direction.

During a sudden deceleration, a person tends to submarine, or slide down and through the lap belt portion of a restraint system. When a person submarines, the lap belt moves up above the pelvis and into contact with the abdomen. The movement of the lap belt on the abdomen toward the thorax tends to move organs in the abdomen toward and into the chest cavity thereby making breathing difficult or impossible.

Straps have been run from the lap belt down between the legs of a person being restrained, over the forward edge of a seat, and to an anchor point on the floor of the driver or passenger compartment. These straps limit submarining, but do not prevent the problem. Such straps generally allow a person to slide down and forward until the pelvis reaches the forward edge of the seat. Such movement may result in injury and will likely place the person in a position which makes it difficult or impossible to operate vehicle controls.

Fire is a possibility in any vehicle crash due to the presence of fuel for internal combustion engines. A body restraint system must, therefore, allow a quick exit from the restraint system. Even in a battery powered vehicle it may be necessary to make a quick exit following a collision due to the presence of chemicals in the batteries. Cam release assemblies have been used with restraint systems to allow quick exits. Some of the currently available release assemblies require frequent cleaning and lubrication to ensure that the release pins do not stick, making it difficult for a person to get out of the restraint system.

Pads in the form of sleeves have been provided that slide over the shoulder straps of a restraint system. The primary purpose of these pads is to prevent the shoulder straps from rubbing the shoulder or neck of a person being restrained. These sleeves frequently slide up or down on the shoulder straps to positions which allow contact between the shoulder strap and a person's shoulder and neck.

SUMMARY OF THE INVENTION

An object of the invention is to provide a body restraint system for racing and off road vehicles which positively positions and restrains a person's pelvis. Another object of the invention is to provide a body restraint system with pads that distribute the force a person exerts on restraining straps over a larger area of the person's body to reduce the maximum force at any given location and thereby reduce the severity of injuries. A further object of the invention is to provide a body restraint system with a cam release assembly that is self-cleaning and requires minimal maintenance. The body restraint system includes a cam release assembly that is positioned against a person's abdomen and below the waist. The cam release assembly includes a plurality of apertures which each receive a strap lug tongue of strap lugs that are attached to the ends of the various straps. When a strap lug tongue is inserted into one of the strap lug apertures in a cam release assembly a retainer pin is cammed up and into the body of the cam release assembly to permit insertion of the tongue. Upon reaching a stop ring in the cam release assembly housing, a bore through the tongue lines up with the retainer pin. The retainer pin passes through the bore in the strap lug tongue and the strap lug is locked in the cam release assembly. The strap lug apertures in the cam release assembly all provide access to an open area within the cam release assembly body that permits any sand and dirt that enters the cam release assembly through the strap lug apertures to fall out through any one of the strap lug apertures.

A right shoulder strap is anchored on the frame of the vehicle to the rear of a person's right shoulder, passes over the shoulder down the right side of the chest, and a strap lug tongue on the end of the right shoulder strap is inserted into a strap lug aperture on the upper side of the cam release assembly and is locked in the cam release assembly. A left shoulder strap is anchored on the frame of the vehicle to the rear of a person's left shoulder, passes over the person's left shoulder down the left side of the chest, and a strap lug tongue on the end of the left shoulder strap is inserted into a strap lug aperture in the upper side of the cam release assembly and locked in the cam release assembly.

A sternum strap has one end secured to one of the shoulder straps slightly below breast level. The free end of the sternum strap passes across the sternum of a person through a slip ring on the other shoulder strap and then extends back toward the end secured to one of the shoulder straps. The sternum strap is locked into position by a fastener sold under the trademark Velcro owned by Velcro U.S.A. Inc., or some other adhesive-type fastener.

A right side lap strap is anchored to the vehicle frame to the right side of the seat below the seat surface that supports a person and near the rear edge of the seat surface that supports a person. The right side lap strap extends up and to the front from the right side anchor, across the right side of a person's pelvis, and a strap lug tongue of a strap lug on the end of the right side lap strap is inserted into a strap lug aperture in the right side of the cam release assembly and is locked in the cam release assembly. A left side lap strap is anchored to the vehicle frame to the left side of the seat below the seat surface that supports a person and near the rear edge of the seat surface that supports a person. The left side lap strap extends up and to the front from the left side anchor, across the left side of a person's pelvis, and a strap lug tongue of a strap lug on the end of the left side lap strap is inserted into a strap lug aperture in the left side of the cam release assembly and is locked in the cam release assembly.

A leg strap has one end attached to the right side lap strap and another end attached to the left side lap strap. The central portion of the leg strap passes under a person's legs. A strap lug with a strap lug tongue is attached to the center portion of the leg strap. The center portion of the leg strap passes up between a person's legs and the strap lug tongue of the strap lug on the leg strap is inserted into a strap lug aperture on the lower side of the cam release assembly and is locked in the cam release assembly.

A kidney strap has a right end secured to the right side lap strap near the strap lug on the end of the right side lap strap. The left end of the kidney strap is secured to the left side lap strap near the strap lug on the end of the left side lap strap. The central portion of the kidney strap passes around the back of a person and is preferably positioned just below the waist.

A right chest pad is attached to the right shoulder strap on the side of the shoulder strap that is toward a person being restrained. The pad is attached to the portion of the right shoulder strap that passes over the shoulder and down the upper part of the chest to form a laminated or sandwich structure. The right chest pad includes an enlarged portion which extends to one side of the right side shoulder strap and toward the left side shoulder strap in the central portion of the chest. A left side chest pad is attached to the left shoulder strap on the side of the shoulder strap that is toward a person being restrained. The left chest pad is attached to the portion of the left shoulder strap that passes over the shoulder and down the upper part of the chest to form a laminated or sandwich structure. The left chest pad includes an enlarged portion which extends to one side of the left shoulder strap and toward the right shoulder strap in the central portion of the chest. The enlarged portions of the right and left chest pads overlap between the chest of a person being restrained and the sternum strap. A pelvic pad is attached to the center portion of the leg strap and is positioned between the cam release assembly and the abdomen of a person being restrained. The three pads distribute force applied to the straps by a person over a larger area of a person's body.

Knurled slide adjusters and tri-glide adjusters are provided on the straps so that the restraint system can be used in vehicles with different mounting points and can be used by people with various physiques. The knurled slide adjusters also allow the various straps to be tightened or loosened as required to obtain optimum restraint and comfort.

The foregoing and other objects, features, and advantages of the present invention will become apparent in the light of the following detailed description of the body restraint system as illustrated in the accompanying drawings.

DESCRIPTION OF THE DRAWINGS

FIG. 2 is a front elevational view of the body restraint system with the shoulder and leg straps extended outwardly for clarity;

FIG. 3 is an expanded view of the cam release assembly;

FIG. 4 is a perspective view of one of the strap lugs;

DESCRIPTION OF THE PREFERRED EMBODIMENT

Figure 1:
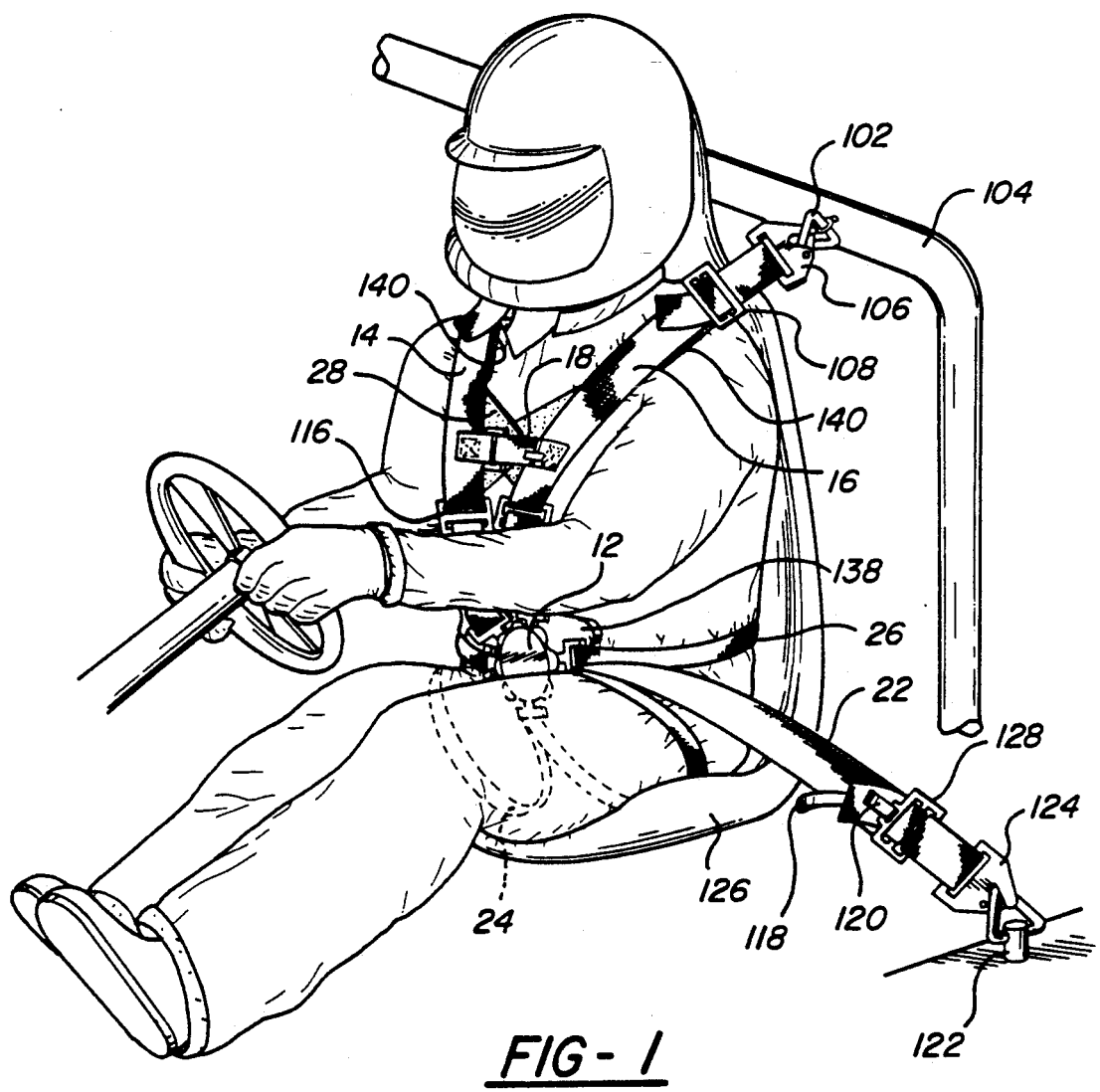
FIG. 1 is a perspective view of a vehicle driver that is restrained by the body restraint system, the body restraint system and a portion of a vehicle in which the body restraint system is mounted.
Figure 5:
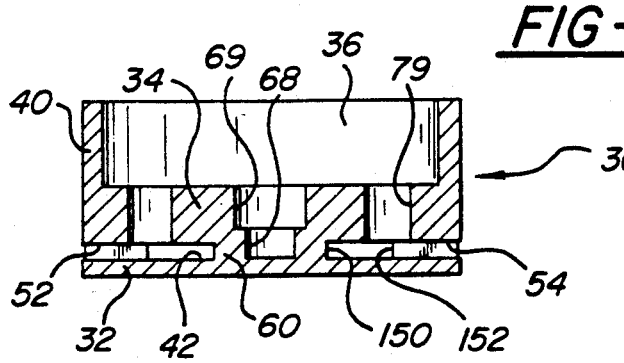
FIG. 5 is a cross-sectional view of the cam release assembly housing.

The body restraint system will be described as it is seen by the person being restrained. The term left will mean on the left hand side of the person shown in FIG. 1 and the term right will mean on the right hand side of the person shown in FIG. 1. Up or above will generally be toward the person's head, and down or below will generally be in the direction of the person's feet if he were standing.

The body restraint system 10 includes a cam release assembly 12, a right shoulder strap 14, a left shoulder strap 16, a sternum strap 18, a right lap strap 20, a left lap strap 22, a leg strap 24, a kidney belt 26, and pad assemblies 28. The cam release assembly 12 shown in FIGS. 3, 4, 5, 6 and 7, has a tubular body 30 with a bottom wall 32 and an interior wall 34. The tubular portion 40 of the tubular body 30 and one side of the interior wall 34 define a cam plate chamber 36. The other side of the interior wall 34, the bottom wall 32 and the tubular portion 40 define an open strap lug chamber 42. Strap lug apertures 44 are provided in the tubular portion 40 for the passage of portions of strap lugs 46 through the wall of the tubular portion 40 and into the strap lug chamber 42. The number of strap lug apertures 44 that are provided depends upon the number of strap lugs 46 that are required by the restraint system. The body restraint system 10 as disclosed requires five strap lug apertures 44. These include a right shoulder strap lug aperture 48, a left shoulder strap lug aperture 50, a right lap strap lug aperture 52, a left lap strap lug aperture 54, and a leg strap lug aperture 56. The strap lug apertures 44 receive the tongue 58 of strap lugs 46. A stop ring 60 between the interior wall 34 and the bottom wall 32 of the tubular body 30 and inside the strap lug chamber 42 limits insertion of the tongues 58 through the strap lug apertures 44 and into the strap lug chamber. The stop ring 60, as shown in FIG. 4, extends from the interior wall 34 to the bottom wall 32 and is integral with interior and bottom walls.

A cylindrical cam actuator 62 with a cam follower 64 and a drive lug 66 is journaled in a bore 68 in the center of the bottom wall 32. The bore 68 does not pass all the way through the bottom wall 32. The cylindrical cam actuator 62 projects up through the strap lug chamber 42, through a large aperture 69 in the center of the stop ring 60 and the interior wall 34 and through the center of the cam plate chamber 36. The cam plate 70 includes a disk member 72 and an integral tube 74 that projects from one side of the center of the disk member 72. The tube 74 has a free end with a cam 76. The cam plate 70 is positioned in the cam plate chamber with the integral tube 74 projecting into and journaled in the aperture 69 through the interior wall 34. The cam follower 64 on the cam actuator 62 is adjacent to the cam 76 and the cam actuator 62 is also journaled in tube 74. The cam plate 70 is normally in contact with the surface of the interior wall 34 that is a wall of the cam plate chamber 36.

Retainer pin apertures 78 in the cam plate 70 are in alignment with retainer pin apertures 79 in the interior wall 34. Retainer pins 80 with head portions 84 and shank portions 82 each have their shank portions inserted through retainer pin aperture 78 in the cam plate 70 and through an aligned retainer pin aperture 79 in the interior wall 34. The shank portions 82 extend all the way across the strap lug chamber 42 and into contact with the bottom wall 32. A cam surface 86 is provided on the side of each shank portion 82 for contact by the tongue 58 of a strap lug 46 and to allow the retainer pins 80 to be cammed up out of the strap lug chamber 42. The head portion 84 of each retainer pin 80 is enlarged so that it can not pass through the retainer pin aperture 78 in the cam plate 70. A surface 88 on the head portion 84 is adjacent to an inside wall surface of the tubular portion 40 of the tubular body 30 and can contact the inside wall surface to prevent rotation of the retainer pins 80 and to keep the cam surface 84 facing toward an adjacent strap lug aperture 44. Rotation of the cam actuator 62 will move the cam follower 64 into contact with cam 76 and raises the cam plate 70. When the cam plate 70 is moved away from the interior wall 34, the upper surface of the cam plate contacts the head portion 84 of each retainer pin 80 and lifts the shank portion 82 out of the strap lug chamber 42. A special retainer pin 90 without a head portion 84 is used in one of the retainer pin apertures 78. When the cam plate 70 is moved away from the interior wall 34, it does not cam the special retainer pin 90 out of the strap lug chamber 42. A coil compression retainer pin spring 92 is provided to bias the shank portion 82 of each retainer pin 80 toward the strap lug chamber 42 and the bottom wall 32. A cam chamber cover 94 closes the open end of the cam plate chamber 36, holds the retainer pin springs 92 in position and provides a spring preload. The cam chamber cover 94 is secured to the tubular body by screws that pass through holes 95 in the cam plate 70 and screw into threaded bores 97 in the interior wall 34. The cam actuator 62 is also journaled in an aperture 96 in the cam chamber cover 94. A hand lever 98 is attached to the drive lug 66 and the portion of the cam actuator 62 that extends through the cam chamber cover 94, by a screw.

During operation of the cam release assembly 12, a tongue 58 of a strap lug 46 is inserted into one of the strap lug apertures. The tongue 58 contacts the cam surface 86 on the retainer pin 80, cams the retainer pin up out of the strap lug chamber 42, and compresses the retainer pin spring 92. Once the retainer pin 80 is forced up into the cam plate chamber 36, the tongue 58 of the strap lug 46 slides on into the cam plate chamber 42 until it contacts the strap lug stop ring 60. Upon contact with the strap lug stop ring 60 movement of the strap lug 46 into the tubular body 30 is stopped, the aperture 100 in the tongue 58 is aligned with a retainer pin 80 and the retainer pin spring 92 drives the retainer pin 80 through the aperture in the tongue. The strap lug 46 is then held in the strap lug aperture 44 until the retainer pin 80 is lifted out of the strap lug chamber 42 by the cam plate 70 upon rotation of the hand lever 98, the cam actuator 62 and the cam follower 64. The cam plate 70 will lift all the retainer pins 80 at one time and release all the strap lugs 46 inserted into the strap lug apertures 44 at one time except the strap lug that is held into the cam release assembly 12 by the special retainer pin 90. The purpose of the special retainer pin 90 is to keep the cam release assembly 12 connected to one strap.

The body restraint system 10 has a right shoulder strap 14 and a left shoulder strap 16. The right and left shoulder straps 14 and 16 are connected to anchors 102 on a frame portion 104 of a vehicle by hooks 106. Each shoulder strap 14 and 16 passes through a tri-glide adjuster 108 and then through a slot in one of the hooks 106. The free end of each strap then passes back through the tri-glide adjuster 108. The tri-glide adjusters 108 allow the shoulder straps 14 and 16 to be adjusted in length for the specific vehicle the body restraint system is mounted in. The right shoulder strap 14 extends from the anchor 102 and the hook 106 forwardly, over the right shoulder of a person being restrained down the right side of the chest and a strap lug 46 on the end of the right shoulder strap is inserted into the right shoulder strap lug aperture 48 in the cam release assembly 12. The left shoulder strap 16 extends from the anchor 102 and the hook 106 forwardly, over the left shoulder of a person being restrained, down the left side of the chest and a strap lug 46 on the end of the left shoulder strap is inserted into the left shoulder strap lug aperture 50 in the cam release assembly 12. A sternum strap 18 is connected between the two shoulder straps 14 and 16 slightly below breast height. The sternum strap 18 includes a slip ring 110 that is attached to a strap 112 sewn to the right shoulder strap 14. The sternum strap 18 further includes a strap 114 with one end sewn to the left shoulder strap 16. The free end of the strap 114 extends from the left shoulder strap 16, across the sternum, through the slip ring 110, and is then folded back on itself toward the left shoulder strap 16. An adhesive or contact type fastener such as fasteners sold under the trademark Velcro attaches one part of the strap 114 to the other part of the strap. The purpose of the sternum strap is to fasten the two chest straps 14 and 16 together to prevent them from spreading apart and allowing a person's chest to move forward from between the shoulder straps 14 and 16. The sternum strap 18 is released by pulling one end of the strap 114 away from another portion of the strap thereby releasing the Velcro fastener and then feeding the free end of the strap back through the slip ring 110. The position of the sternum strap 18 relative to a person's chest is set by adjusting the right and left shoulder straps 14 and 16 in the tri-glide adjusters 108. The right and left shoulder straps 14 and 16 are tightened by knurled slide adjusters 116. Knurled slide adjusters connect two separate strap sections between the sternum strap 18 and the strap lug 46. One strap section runs through a slot, is folded back upon itself and is sewn together. The other strap section runs through a slot, around a knurled slide bar and back through a slot. The right and left shoulder straps 14 and 16 are tightened by pulling on thumb pull straps 118. The knurled slide adjusters are loosened by pulling on the adjuster pull tabs 120 and allowing the portion of the strap the thumb pull strap 118 is attached to, to slide back over a knurled sliding bar.

A right side lap strap 20 and a left side lap strap 22 are connected to anchors 122 on a frame portion of a vehicle by hooks 124. The anchors 122 are below and to the rear of the portion of a seat 126 that supports the person being restrained. The right side lap strap 20 extends upwardly and forwardly from the anchor 122, across the right side of the pelvis of the person being restrained and a strap lug 46 on an end of the right side lap strap 20 is inserted into the right lap strap lug aperture 52 of the cam release assembly 12. A knurled slide adjuster 128 is provided in the right lap strap 20 between the hook 124 and the portion of the strap which contacts the pelvis area of the person being restrained. The knurled slide adjuster 128 is identical to the slide adjuster 116 and is tightened by pulling a thumb pull strap 118. The knurled slide adjuster 128 is loosened by pulling an adjuster release pull tab 120 and letting the end of the right lap belt section with the thumb pull strap 118 slide back over a knurled sliding bar in the slide adjuster.

A left side lap strap 22 extends upwardly and forwardly from the anchor 122, across the left side of the pelvis of the person being restrained and a strap lug 46 on an end of the left side lap strap 22 is inserted into the left lap strap lug aperture 54 of the cam release assembly 12. A knurled slide adjuster 128 is provided in the left lap strap 22 between the hook 124 and the portion of the strap which contacts the pelvis area of the person being restrained. The knurled slide adjuster 128 is identical to the knurled slide adjusters 116 for adjusting the shoulder straps. The knurled slide adjuster 128 on the left lap strap 22 is tightened by pulling a thumb strap 118. The knurled slide adjuster 128 is loosened by pulling an adjuster release pull tab 120 and letting the end of the left lap belt section with the thumb pull strap 118 slide back over the knurled sliding bar in the slide adjuster. The right and left lap straps 20 and 22 are provided with separate knurled slide adjusters 128. The separate adjusters allow adjustment of the lateral position of a person being restrained by the body restraint system 10.

A leg strap 24 has one end attached to the right lap strap 20 adjacent to the strap lug 46 on an end of the right lap strap. The other end of the leg strap 24 is attached to the left lap strap 22 adjacent to the strap lug 46 on an end of the left lap strap. A strap lug 46 is sewn into the center portion of the leg strap 24. The leg strap 24 extends from its attachments to the right and left lap straps 20 and 22 under both legs of a person being restrained. The strap lug 46 in the center of the leg strap 24 passes up between the legs of the person and is inserted into the leg strap lug aperture 56 in the cam release assembly 12. A right leg strap knurled slide adjuster 130 and an identical left leg strap knurled slide adjuster 130 are provided in the leg strap 24. The knurled slide adjusters 130 function like the knurled slide adjusters 116 and 128, but are smaller because the leg strap is not as wide as the lap straps 20 and 22. The knurled slide adjusters 130 allow the person being restrained by the body restraint system 10 to tighten the leg strap 24 around each leg.

A kidney strap 26 has an end sewn to the right lap strap 20 adjacent to the strap lug 46 and another end sewn to the left lap strap 22 adjacent to the strap lug 46. The kidney strap passes around the back of the person being restrained and is preferably positioned just below the waist. A pair of knurled slide adjusters 132 are provided in the kidney strap for length adjustment. The knurled slide adjusters 132 are identical to the knurled slide adjusters 130 used with the leg strap 24. Thumb pull straps 118 are pulled to tighten the kidney strap 26. The knurled slide adjusters 132 also have adjuster pull tabs, for releasing tension on the kidney strap 26, which are not shown.

The right shoulder strap 14, the left shoulder strap 16, the right lap strap 20 and the left lap strap are three inch wide straps. These three inch wide straps have a 9,000 pound rating and will not break until they are subjected to a load of 13,000 pounds to 16,000 pounds. When the three inch wide straps are under substantial tension, they become very hard and rigid. The leg straps 24 and a portion of the kidney strap are one and three fourths of an inch wide, have a 6,000 pound rating, and do not fail until they are subjected to a load of about 9,000 pounds.

Figure 8:
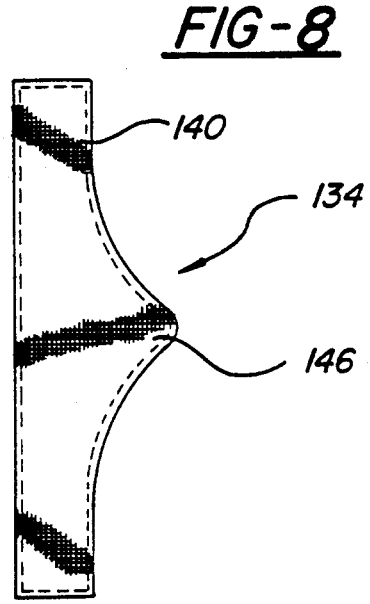
FIG. 8 is a front view of the right chest pad.
Figure 9:
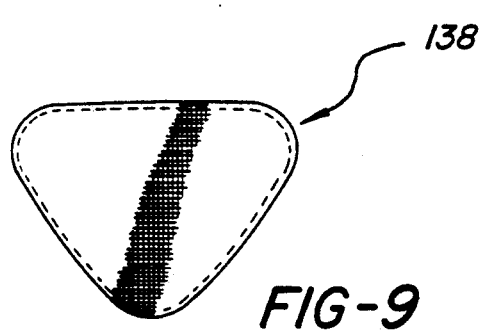
FIG. 9 is a front view of the pelvic pad.

In a vehicle crash a person in a restraint system is thrown against the restraining straps. The resulting tension on the straps makes the straps hard and rigid. Straps in a tensioned rigid condition can cause injury. Pad assemblies 8 are attached to the restraining straps and positioned between the straps and the person being restrained to distribute the force over a larger area of a person's body and to reduce the peak force exerted on a person's body. Each pad in the pad assemblies 28 is a high density polyurethane foam or a similar material in a bag made from a durable nylon called denier nylon or pack cloth. The foam material is normally about 0.25 inches thick. However, the thickness can be varied as required. A person with low body fat would require a thicker pad than a person with high body fat for both people to obtain the same degree of protection from the body restraint system. The pad assemblies include a right chest pad 134, a left chest pad 136, and a pelvic pad 138 or 138a. The right chest pad 134 includes an elongated portion 140 that is sewn to the portion of the underside of the right shoulder strap 14 that passes over the shoulder of a person being restrained and down the upper portion of the chest. The stitching which sews the elongated portion 140 of the right chest pad 134 to the right shoulder strap 14 to form a sandwich structure is shown at 142 in FIG. 2. The right chest pad 134 extends on down the chest toward pelvic pad 138 under the right shoulder strap 14 and under the knurled slide adjuster 116. In the area of the sternum strap 18, the right chest pad 134 has an enlarged portion 146 that extends to the left. The left chest pad 136 includes an elongated portion 140 that is sewn to the portion of the underside of the left shoulder strap 16 that passes over the shoulder of a person being restrained and down the upper portion of the chest. The stitching which sews the elongated portion 140 of the left chest pad 13 to the left shoulder strap 16 to form a sandwich structure is shown at 144 in FIG. 2. The left chest pad 136 extends on down the chest toward the pelvic pad 138 under the left shoulder strap 16 and under the knurled slide adjuster 116. In the area of the sternum strap 18, the left chest pad 134 has an enlarged portion 146 that extends to the right. The right chest pad 134 and the left chest pad 136 are identical. The right chest pad as shown in FIG. 8 is merely turned 180° about a vertical axis so that the enlarged portions 146 extend toward each other and overlap under the sternum strap 18. The portions of the right and left chest pads 134 and 136 below the stitches 142 and 144 are allowed to float between the chest of a person being restrained and the right shoulder strap 14 and the left shoulder strap 16. By letting the chest pads 134 and 136 float, they accommodate adjustment of the sternum strap 18 and the space between the right and left shoulder straps 14 and 16. The floating chest pads 134 and 136 also accommodate adjustment of the length of the right and left shoulder straps 14 and 16 with the knurled slide adjusters 116.

Figure 6:
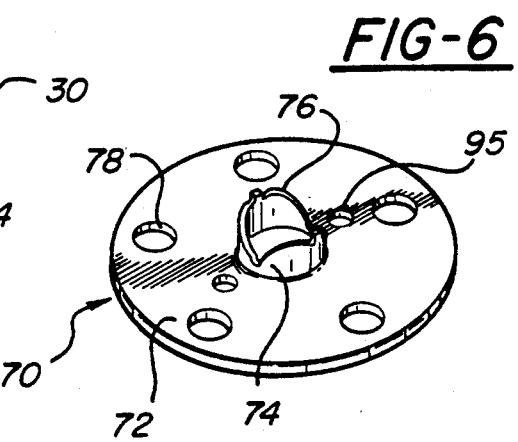
FIG. 6 is a perspective view of the bottom side of the cam plate.
Figure 10:
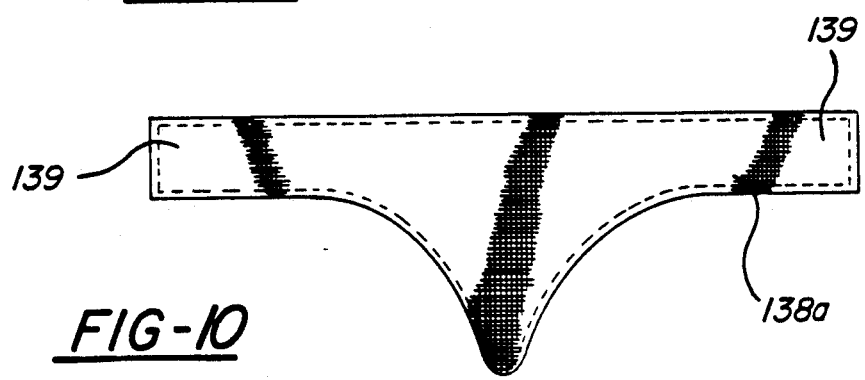
FIG. 10 is a front view of an alternate pelvic pad.

The pelvic pad 138 is sewn to the leg strap 24 and is positioned under the cam release assembly 12, the right and left lap straps 20 and 22 and under the strap lugs 46 for the right and left shoulder straps 14 and 16. In this position the pelvic pad 138 cushions and distributes the force exerted on the pelvis and the abdomen of a person being restrained by the restraint system. The pelvic pad 138 as shown in FIGS. 1, 2 and 6 is the preferred form for the pelvic pad. An alternate form is the pelvic pad 138a shown in FIG. 10. The pelvic pad extensions 139 on the pelvic pad 138a extend under the right lap strap 20 and the left lap strap 22 where lap straps pass over the sides of the pelvis.

Figure 7:
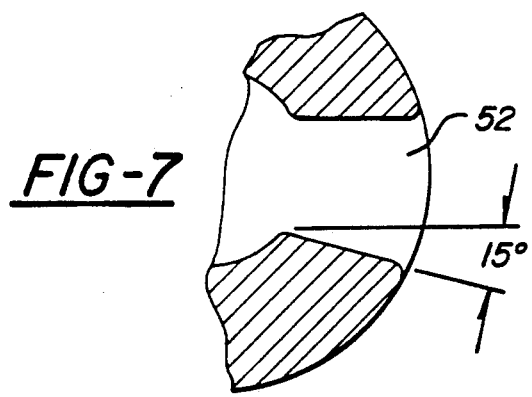
FIG. 7 is an enlarged cross-sectional view of one of the lap strap lug apertures in tubular body of the cam release.

The strap lug 46 on the right lap strap 20 can pivot about 15 degrees in the right lap strap lug aperture 52 about the axis of the retainer pin 80 as shown in FIG. 7. The strap lug 46 on the left lap strap 22 can also pivot about 15 degrees in the left lap strap lug aperture 54 about the axis of the retainer pin 80. This pivotal movement allows the strap lugs 46 to pull straight on the right and left lap straps 20 and 22. If a strap lug 46 pulls more on one side of a three inch wide strap than it does on the other side, the force that will fail the strap is substantially reduced. The 15 degrees of movement of each lap strap 20 and 22 in the cam release assembly 12 is sufficient to allow proper positioning of the cam release assembly 12 relative to people with various sizes and shapes. Proper positioning of cam release assembly 12 and free pivotal movement of strap lugs 46 of the lap straps 20 and 22 about the retainer pins 80 allows the lap straps to be evenly tensioned across the three inch width and to lay flat where it makes contact with a person. The strap lugs for the right and left shoulder straps 14 and 16 can pivot slightly in the right and left shoulder strap lug apertures 48 and 50. Slight pivotal movement is all that is required to keep the right and left shoulder straps 14 and 16 straight. The strap lug 46 for the leg strap 24 does not need to pivot to properly load the leg strap 24. The leg strap lug aperture 56 is, however, somewhat larger than the tongue 58 to allow sand and dirt which enter the strap lug chamber 42 to fall from the strap lug chamber. The employment of the strap lug stop ring 60 with a wall 150 that is spaced from the inside wall 152 of the strap lug chamber 42 creates an open strap lug chamber that permits the passage of sand and dirt through the chamber. This substantially reduces the cleaning required to keep the retainer pins 80 free to move and unbound.

The kidney strap 26 is not required when the body restraint system is employed in combination with a well designed seat. The kidney strap 26 can, however, enhance comfort for the person being restrained. The kidney strap 26 will also help keep the pelvis in a fixed position when the restraint system is used with a seat that is not well designed.

The leg strap 24 keeps the right and left lap straps 20 and 22 and the cam release assembly 12 in the proper position relative to the pelvis of a person being restrained to minimize injury in a crash and to keep the person being restrained in a position from which vehicle controls can be easily reached. In addition, the leg strap 24 prevents submarining. The cam release assembly 12 releases all of the straps except the sternum strap 18. The cam release assembly 12 thereby allows a quick exit from the vehicle if it is necessary to make a quick exit.

The preferred embodiment of the invention has been described in detail, but is an example only, and the invention is not restricted thereto. It will be easily understood by those skilled in the art that modifications and variations can easily be made within the scope of this invention.

I claim:

1. A restraint system for restraining a person in a road vehicle including a strap retaining and release assembly; a right shoulder strap with one end adapted to anchor to the vehicle, the other end being releasably attachable to the assembly, and having a portion that passes over the right shoulder and down the right side of the chest of a person being restrained; a left shoulder strap with one end adapted to anchor to the vehicle, the other end being releasably attachable to the assembly, and having a portion that passes over the left shoulder and down the left side of the chest of a person being restrained; a right lap strap with one end adapted to anchor to the vehicle, the other end being releasably attachable to the assembly and having a portion that passes over the right side of the pelvis of a person being restrained; a left lap strap with one end adapted to anchor to the vehicle, the other end being releasably attached to the assembly, and having a portion that passes over the left side of the pelvis of a person being restrained; and a leg strap for the prevention of submarining having an end attached to the right lap strap, another end attached to the left lap strap, a right leg portion which extends from the right lap strap, under the right leg, up between both legs, a left leg portion which extends from the left lap strap, under the let leg, up between both legs, and mechanism for releasably attaching said right and left leg portions to the assembly.

2. A restraint system for restraining a person in a vehicle as set forth in claim 1 which further includes an adjustable length sternum strap releasably connectable between the right and left shoulder straps that resists separation of the right and left shoulder straps to prevent the upper portion of a person's body from moving between the right and left shoulder straps.

3. A restraint system for restraining a person in a vehicle as set forth in claim 2 which further includes a right chest pad attached to the underside of the right shoulder strap and having an enlarged portion that extends to the left of the right shoulder strap; a left chest pad attached to the underside of the left shoulder strap and having an enlarged portion that extends to the right of the left shoulder strap and wherein the enlarged portions of the two chest pads overlap each other in an area between the chest of a person being restrained by the sternum strap.

4. A restraint system for restraining a person in a vehicle as set forth in claim 3 which further includes a pelvis pad positioned between the person being restrained and the strap retaining and release assembly.

5. A restraint system for restraining a person in a vehicle as set forth in claim 2 which further includes an adjuster to adjust the length of the right shoulder strap, an adjuster to adjust the length of the left shoulder strap, an adjuster to adjust the length of the right lap strap and an adjuster to adjust the length of the left lap strap.

6. A restraint system for restraining a person in a vehicle as set forth in claim 1 which further includes an adjuster to adjust the length of the right shoulder strap, an adjuster to adjust the length of the left shoulder strap, an adjuster to adjust the length of the right lap strap, an adjuster to adjust the length of the left lap strap, an adjuster to adjust the length of the portion of the leg strap that extends under the right leg of a person being restrained, and an adjuster to adjust the length of the portion of the leg strap that extends under the left leg of a person being restrained.

7. A restraint system for restraining a person in a vehicle, as set forth in claim 1 wherein the strap retaining and release assembly is a cam release with a body, a plurality of strap lug apertures in the body, a plurality of retainer pins mounted in the body that are operable to attach an end of the right shoulder strap, an end of the left shoulder strap, an end of the right lap strap and an end of the left lap strap to the assembly, a cam plate mounted in the body, and a cam actuator mounted in the body and operable to move the cam plate and a plurality of the retainer pins to release at least two straps.

8. A restraint system for restraining a person in a vehicle as set forth in claim 2 which further includes a kidney belt with one end attached to the right lap strap, another end attached to the left lap strap and a center portion which extends around the rear side of a person being restrained.

9. A restraint system for restraining a person in a vehicle as set forth in claim 8 which further includes an adjuster to adjust the length of the kidney belt.

10. A restraint system for restraining a person in a vehicle as set forth in claim 5 which further includes a kidney belt with one end attached to the right lap strap, another end attached to the left lap strap, a center portion which extends around the rear side of a person being restrained and an adjuster to adjust the length of the kidney belt.

11. A restraint system for restraining a person in a road vehicle including a strap retaining and cam release assembly with a body having a bottom wall, a side wall, an interior wall, an open strap lug chamber inside the body and between the bottom wall and the interior wall, a right shoulder strap lug aperture through the body side wall and into the open strap lug chamber, a left shoulder strap lug aperture through the body side wall and into the open strap lug chamber, a right lap strap lug aperture through the body side wall and into the open strap lug chamber, a left lap strap lug aperture through the body side wall and into the open strap lug chamber, a leg strap lug aperture through the body side wall and into the open strap lug chamber and in communication with other strap lug apertures to allow foreign material to fall from the strap lug chamber, a cam actuator rotatably mounted in the body, a cam plate mounted in the body adjacent to a side of the interior wall and outside the open strap lug chamber, at least five retainer pin apertures through the cam plate, at least five retainer pin apertures through the interior wall each of which is in axial alignment with one of the retainer pin apertures through the cam plate, a retainer pin mounted in each pair of axially aligned retain pin apertures through the interior wall and the cam plate and extending into the open strap lug chamber, a cam surface on the cam plate that is engageable with the cam actuator and is operable to move the cam plate away from the interior wall in response to movement of the cam actuator, a spring for biasing each retainer pin toward the bottom wall of the body, a cam chamber cover attached to the body which preloads the springs for biasing the retainer pins, a handle connected to the cam actuator and operable to rotate the cam actuator, move the cam plate away from the interior wall and move a plurality of the retainer pins away from the bottom wall and to compress the springs that bias the retainer pins that are away from the bottom wall; a right shoulder strap with one end adapted to anchor to the vehicle, a right shoulder strap lug on the other end of the right shoulder strap with a tongue passing through the right shoulder strap lug aperture and retained in the open strap lug chamber by one of the retainer pins and having a portion that passes over the right shoulder and down the right side of the chest of a person being restrained; a left shoulder strap with one end adapted to anchor to the vehicle, a left shoulder strap lug on the other end of the left shoulder strap with a tongue passing through the left shoulder strap lug aperture and retained in the open strap lug chamber by one of the retainer pins and having a portion that passes over the left shoulder and down the left side of the chest of a person being restrained; a right lap strap with one end adapted to anchor to the vehicle, a right lap strap lug on the other end of the right lap strap with a tongue passing through the right lap strap lug aperture and retained in the open strap lug chamber by one of the retainer pins and having a potion that passes over the right side of the pelvis of a person being restrained; a left lap strap with one end adapted to anchor to the vehicle, a left lap strap lug on the other end of the left lap strap with a tongue passing through the left lap strap lug aperture and retained in the open strap lug chamber by one of the retainer pins and having a portion that passes over the left side of the pelvis of a person being restrained; and a leg strap for the prevention of submarining with one end attached to the right lap strap, the other end attached to the left lap strap, a portion which extends from the right lap strap under the right leg up between both legs, a portion which extends from left lap strap under the left leg up between both legs and wherein the portion of the leg strap that extends up between both legs is attached to a leg strap lug with a tongue passing through the leg strap lug aperture and retained in the open strap lug chamber by one of the retainer pins; an adjustable length sternum strap releasably connectable between the right and left shoulder straps that resist separation of the right and left shoulder straps to prevent the upper portion of a person's body from moving between the right and left shoulder straps; a right chest pad attached to the underside of the right shoulder strap and having an enlarged portion that extends to the left of the right shoulder strap; a left chest pad attached to the underside of the left shoulder strap and having an enlarged portion that extends to the right of the left shoulder strap; a pelvis pad positioned between the person being restrained and the release assembly; and an adjuster to adjust the length of the right shoulder strap, an adjuster to adjust the length of the left shoulder strap, an adjuster to adjust the length of the right lap strap and an adjuster to adjust the length of the left lap strap.

12. A restraint system for restraining a person in a vehicle as set forth in claim 11 which further includes a kidney belt with one end attached to the right lap strap, another end attached to the left lap strap and having a portion which extends around the rear side of a person being restrained.

13. A restraint system for restraining a person in a vehicle as set forth in claim 12 which further includes an adjuster to adjust the length of the kidney belt.

14. A restrains system strap retention and cam release assembly with a body having a bottom wall, an interior wall, an open strap lug chamber inside the body and between the bottom wall and the interior wall, a right shoulder strap lug aperture through the body and into the strap lug chamber, a left shoulder strap lug aperture through the body and into the open strap lug chamber, a right lap strap lug aperture through the body and into the open strap lug chamber, a left lap strap lug aperture through the body and into the open strap lug chamber, a leg strap lug aperture through the body and into the open strap lug chamber and in communication with other strap lug apertures to allow foreign material to fall from the strap lug chamber, a cam actuator rotatably mounted in the body, a cam plate mounted in the body adjacent to a side of the interior wall and outside the open strap lug chamber, at least five retainer pin apertures through the cam plate, at least five retainer pin apertures through the interior wall each of which is in axial alignment with one of the retainer pin apertures through the cam plate, a retainer pin mounted in each pair of axially aligned retainer pin apertures through the interior wall and the cam plate and extending into the open strap lug chamber, a cam surface on the cam plate that is engageable with the cam actuator and is operable to move the cam plate away from the interior wall in response to movement of the cam actuator, a spring for biasing each retainer pin toward the bottom wall of the body, a cam chamber cover attached to the body which preloads the springs for biasing the retainer pins, and a handle connected to the cam actuator and operable to rotate the cam actuator, move the cam plate away from the interior wall and move a plurality of the retainer pins away from the bottom wall and to compress the springs that bias the retainer pins that are moved away from the bottom wall.

15. A restraint system strap retention and cam release assembly as set forth in claim 14 wherein the right lap strap lug aperture allows a lap strap lug to pivot about 15° about the axis of a retainer pin when a lap strap lug is retained in the right lap strap lug aperture by a retainer pin and the left lap strap lug aperture allows a lap strap lug to pivot about 15° about the axis of a retainer pin when a lap strap lug is retained in the right lap strap lug aperture by a retainer pin.

16. A restraint system for restraining a person in a road vehicle including a cam-operated strap retention and release assembly; a right shoulder strap with one end adapted to anchor to the vehicle, the other end attached to the assembly and having a portion that passes over the right shoulder and down the right side of the chest of a person being restrained; a left shoulder strap with one end adapted to anchor to the vehicle, the other end attached to the assembly and having a portion that passes over the left shoulder and down the left side of the chest of a person being restrained; a right lap strap with one end adapted to anchor to the vehicle, the other end attached to the assembly and having a portion that passes over the right side of the pelvis of a person being restrained; a left lap strap with one end adapted to anchor to the vehicle, the other end attached to the assembly and having a portion that passes over the left side of the pelvis of a person being restrained; an adjustable length sternum strap releasably connectable between the right and left shoulder straps that resists separation of the right and left shoulder straps to prevent the upper portion of a person's body from moving between the right and left shoulder straps; a right chest pad attached to the underside of the right shoulder strap and having an enlarged portion that extends to the left of the right shoulder strap; and a left chest pad attached to the underside of the left shoulder strap and having an enlarged portion that extends to the right of the left shoulder strap and wherein the enlarged portions of the right and left chest pads overlap each other in an area between the chest of a person being restrained and the sternum strap.

17. A cam-operated strap retention and release assembly for use with a restraint system, having a plurality of body embracing straps with lugs thereon provided with lock openings, for holding a person in a vehicle seat, including: a body having a bottom wall, a side wall, and an interior wall spaced above the bottom wall to provide an open strap lug chamber inside the body and between the bottom wall and the interior wall, said interior wall having a plurality of apertures extending through said interior wall to communicate with said lug chamber, there being a plurality of strap lug apertures that pass through the body side wall and into the open strap lug chamber, a cam plate mounted for lug releasing movement in the body above the interior wall and having a plurality of retainer pin apertures extending through the cam plate in alignment with the interior wall apertures, retainer pins, for entering said locking openings in the strap lugs when the lugs are inserted through said lug apertures into the lug chamber, movably mounted in said aligned apertures through the cam plate and interior wall to extend into the open strap lug chamber, at least some of said retainer pins being cooperable with said cam plate to be withdrawn thereby, a cam surface on the cam plate, and a cam actuator engageable with the cam surface on the cam plate and operable to move the cam plate to at least partially withdraw said retainer pins from the open strap lug chamber to release them from said lug lock openings.

18. A cam release assembly as set forth in claim 17 which further includes a cam chamber cover attached to the body of the cam release assembly.

19. A cam release assembly as set forth in claim 18 which further includes a plurality of springs within said body which are mounted to bias said retainer pins toward the bottom wall of the body.

20. A cam release assembly as set forth in claim 17 wherein at least one of said retainer pins is not withdrawn from the open strap lug chamber by the cam plate thereby keeping the release assembly connected to at least one strap lug when the cam plate is moved to withdraw the retainer pins.

21. A restraint system for restraining a person in a road vehicle including a strap retaining and release assembly; a right lap strap with one end adapted to anchor to the vehicle, the other end being releasably attachable to the assembly and having a portion that passes over the right side of the pelvis of a person being restrained; a left lap strap with one end adapted to anchor to the vehicle, the other end being releasably attached to the assembly, and having a portion that passes over the left side of the pelvis of a person being restrained; and a leg strap for the prevention of submarining having an end attached to the right lap strap, another end attached to the left lap strap, a right leg portion which extends from the right lap strap, under the right leg, up between both legs, a left leg portion which extends from the left lap strap, under the left leg, up between both legs, and mechanism for releasably attaching said right and left leg portions to the assembly.

22. A restraint system for restraining a person in a road vehicle as set forth in claim 21 including a kidney belt with one end attached to the right lap strap, another end attached to the left lap strap and a center portion which extends around the rear side of a person being restrained.

23. A restraint system for restraining a person in a road vehicle as set forth in claim 22 which further includes a pelvis pad positioned between the person being restrained and the strap retaining and release assembly.

24. A restraint system for restraining a person in a road vehicle as set forth in claim 16 including a pelvis pad positioned between the person being restrained and the assembly.

* * * * *

UNITED STATES PATENT AND TRADEMARK OFFICE
CERTIFICATE OF CORRECTION

PATENT NO. : 5,306,044
DATED : April 26, 1994
INVENTOR(S) : Curt L. Tucker

It is certified that error appears in the above-identified patent and that said Letters Patent is hereby corrected as shown below:

Column 8, line 64, change "13" to -- 136 --.

Column 10, line 46, change "let" to -- left --.

Column 12, line 4, change "retain" to -- retainer --; line 37, change "potion" to -- portion --.

Column 13, line 13, change "restrains" to -- restraint --.

Signed and Sealed this

Ninth Day of August, 1994

Attest:

BRUCE LEHMAN

Attesting Officer

Commissioner of Patents and Trademarks